United States Patent [19]

Alber et al.

[11] 4,306,054
[45] Dec. 15, 1981

[54] PROCESS FOR THE PRODUCTION OF EPOXIDE RESINS

[75] Inventors: Ferdinand Alber, Naumburg; Wolfgang Böhm, Halle-Neustadt; Manfred Gaikowski, Naumburg; Christian Günther, Leuna; Herbert Hecker, Halle-Neustadt; Walter Höringklee; Lothar Kaiser, both of Leuna; Helmut Kopp, Halle-Neustadt; Erna Lange, Rippach; Gotthold May, Halle-Neustadt; Martin Müller, Halle-Neustadt; Wieland Schäfer, Halle-Neustadt; Jürgen Schillgalies, Halle-Neustadt; Manfred Scholz, Grosskorbetha; Günter Seidel, Bad Durrenberg, all of German Democratic Rep.

[73] Assignee: Veb Leuna-Werke "Walter Ulbricht" Leuna, Leuna, German Democratic Rep.

[21] Appl. No.: 91,654

[22] Filed: Nov. 5, 1979

[51] Int. Cl.$^3$ .............................................. C08G 59/06
[52] U.S. Cl. ................................ 528/95; 260/348.15; 528/499
[58] Field of Search ...................... 260/348.15; 528/95

[56] References Cited

U.S. PATENT DOCUMENTS

| | | | |
|---|---|---|---|
| 2,840,541 | 6/1958 | Pezzaglia | 260/47 |
| 2,943,096 | 6/1958 | Reinking | 260/348.6 |
| 2,986,551 | 5/1961 | Griffin et al. | 260/47 |
| 3,069,434 | 12/1962 | Spence et al. | 260/348.6 |
| 3,221,032 | 11/1965 | Price et al. | 260/348.6 |

FOREIGN PATENT DOCUMENTS 2745150 6/1978 Fed. Rep. of Germany .

OTHER PUBLICATIONS

Davidson et al., "Water Soluble Resins", Reinhold, 1962, p. 5.
Akutin et al., "Polycondensation at the Interface", Chemical Abstracts 55, 27959c (1961).

*Primary Examiner*—Earl A. Nielsen
*Attorney, Agent, or Firm*—Nolte and Nolte

[57] ABSTRACT

The invention relates to the continuous production of epoxide resins of low, medium and high molecular weight, and also to their purification and to that of the waste water. No raw materials are required in addition to epichlorohydrin, 2,2-bis-(4-hydroxyphenyl)-propane, alkali hydroxide and water. The raw materials are fed at a shear rate of $7.5-50 \times 10^4$ sec$^{-1}$ (at a peripheral speed of the rotor of 15 to 50 m/sec and a distance of the rotor elements from the stator elements of 0.01 to 0.02 cm) continuously into a reactor and mixed in such a way that by the concentration of high kinetic energy in a very limited space the interfaces of the phases of the heterogeneous reaction mixture are increased to an extreme extent and the reagents are caused to react with one another within 5 sec. at the latest.

The reaction proceeds very evenly in the reactor. By conversion of the kinetic energy and reaction heat of the chemical reaction the necessary reaction temperature is maintained for the reaction system within the reactor. The resins obtained and also their waste water are extracted in a pulsation unit in a counterflow, by means of water or organic solvents. This process enables epoxide resins of superior quality to be economically produced. The contamination of the waste water can be thus reduced to a minimum.

15 Claims, No Drawings

PROCESS FOR THE PRODUCTION OF EPOXIDE RESINS

BACKGROUND OF THE INVENTION

This invention relates to a process for the production of epoxide resins from 2,2-bis-(4-hydroxyphenyl)-propane, epichlorohydrin and aqueous alkali hydroxide solution on a continuous basis and also to the purification of the resulting epoxide resin solution and waste water produced.

Processes are known for the production of epoxide resins and in a majority 2,2-bis-(4-hydroxyphenyl)-propane, epichlorohydrin and sodium hydroxide solution are reacted. These processes are accompanied by the formation of the polyglycidyl ethers of 2,2-bis-(4-hydroxphenyl)-propane. The resulting epoxide resins usually consist of mixtures of epichlorohydrin-2,2-bis-(4-hydroxphenyl)-propane-condensation products with differing degrees of condensation.

By altering the 2,2-bis-(4-hydroxphenyl)-propane to epichlorohydrin ratio, the number (n) indicating the chain length of the molecule can be varied. The epoxide resin can thus be set to the desired molecular weight. Epoxide resins are distinguished according to the value of n, as follows:

| | |
|---|---|
| Epoxide resins of low molecular weight: | n = 0 |
| Epoxide resins of medium molecular weight: | n = 1 to 2 |
| Epoxide resins of high molecular weight: | n = 2 |

Methods are known for the non-continuous production of epoxide resins in stirring containers. This process, however, results in considerable fluctuations in the quality of the product, besides which intermittent apparatus only provides a very limited volumetric yield per unit of time.

To improve the efficiency of non-continuous processes, variants have been described in which catalysts or dissolving intermediaries are employed. These variations, however, only result in partial improvements and even exert to some extent unfavorable effect on the quality of the resin, or else they cause additional problems, such as that of separating the dissolving intermediary.

An effect improvement in the intermittent method was obtained by the use of high-speed agitators, such a described in certain patents (U.S. Pat. No. 3,767,618 German Unexamined Specification ecn. No. 2,341,303).

On an industrial scale continuous processes for the production of epoxide resins operate far more economically than non-continuous methods.

A description has been given of a process for the continuous production of epoxide resins of low molecular weight, in which the synthesis of the resin is carried out in a number of stages in a stirring cascade (U.S. Pat. No. 2,840,541), a mixture of epichlorohydrin and 2,2-bis-(4-hydroxyphenyl)-propane being caused to react with soda lye in two to three reaction zones. When 2 reaction zones are adopted, 40–75% and preferably 65% of the soda lye employed is fed into the 1st zone and the remainder into the 2nd zone. The throughput in the 1st zone amounts to 1 mol dian 2,2-bis-(4-hydroxphenyl)-propane per hr and liter space of the reaction chamber. The resin obtained as a molecular weight of about 380–420.

Systems are also known in which, by the use of dissolving intermediaries, the time for which the mixture has to remain in the reaction vessels can be shortened (U.S. Pat. No. 2,848,439). The dissolving intermediary used in this case consists of an aliphatic secondary alcohol. The reaction temperature ranges from 70° to 80° C. The duration amounts to 2 hrs and the throughput to 0.23 mol dian per hr. and liter reaction chamber.

In the known processes, however, the reaction times are still very long, so that only slight volumetric yields per unit of time are obtainable. In the case of cascade type stirring apparatus, furthermore, mixtures occur in each reaction chamber which have an unfavorable effect on the quality of the resin.

In order to mitigate these drawbacks, use is made of cascade typestirring apparatus with a large number of reaction vessels. According to U.S. Pat. No. 2,986,551, for instance, the operation is carried out in a cascade-type stirring apparatus with 6 reactors. The dissolving intermediary employed consists of acetone. The alkali lye is fed in stagewise, in quantities of 12.5 to 45% in each case. The duration amounts to 3–15 min. in each stage, with temperatures of 100°–180° C. The resin produced has a molecular weight of 366 and a viscosity of 150 P at 25° C.

According to U.S. Pat. No. 3,069,434 likewise, a cascade with 6 reactors is used. The dissolving intermediary used consists of alcohol. The alkali lye is fed into each stage. The temperature amounts to 50°–80° C. and the duration is 10–20 min. per stage.

The large number of reactors and the resulting gradual conversion of the reagents certain reduces the mixture effects, but very large production plant is required.

Continuous processes for the production of epoxide resins, dispensing with reaction vessels, offer technical advantages over the foregoing.

All continuous processes hitherto known operate either with auxiliary materials such as dissolving intermediaries or amines, thus suffering from serious drawbacks, or with long reaction times, providing only very limited volumetric yields per unit of time.

The use of dissolving intermediaries increases the cost of the process, renders it more difficult to work up the reaction mixture and usually entails expensive separating operations. Increased expenditure on safety systems is likewise involved. In the catalytic processes, not only the cost of the catalysts has to be considered (frequent use being made of amines of quaternary ammonium salts) but difficulties are also encountered in the separation of the catalysts, so that the quality of the resins is frequently unsatisfactory.

Furthermore, the relatively low throughput speeds necessitate disproportionate dimensions for the production plant or the use of a large number of reactors.

It is also generally known that the production of epoxide resins is accompanied by that of crude resins contaminated with inorganic compounds, such as NaCl and NaOH, as well as organic compounds, such as glycerine, polyglycerine and undefined crosslinked polymers. These contamination agents enter the waste water after the purification and thus cause environmental pollution.

A decisive factor for the quality of the resin is that these impurities should be removed from the latter, as far as possible in their entirety. As regards the waste water, it is essential that the residual resins and the impurities should likewise be totally removed.

The purification method adopted is generally one in which the crude resin is given an addition of an organic solvent, such as an aromatic substance, a cycloaliphatic, a lower alcohol or a low ketone, after which the resulting suspension, consisting of the resin solution and the solids, is subjected to a purification process.

Systems are known in which the solids of such suspensions are removed by filtering or centrifuging processes (USSR Pat. No. 191,118, Swiss Pat. No. 382,448, German Examined Specification No. 1,593,819). In such cases use is made of a solvent in which the inorganic compounds are insoluble. For the complete separation of the inorganic salts the resin solution is dehydrated and then filtered or centrifuged.

This purification method has been found inadequate, as the resin solution then still retains glycerine and polyglycerine, which adversely affect the quality of the resins, particularly their transparency.

Systems are also known in which the resin suspension is purified by washing it with water and decanting it from the solid polymers (U.S. Pat. No. 2,839,494, German Unexamined Specification No. 2,217,239).

Owing to the unsatisfactory phase separation the above washing process is usually performed intermittently in a stirring unit.

In this method the resin is absorbed in an organic solvent, such as toluene. The inorganic compounds and the glycerines are then dissolved out with water. Owing to the density difference the organic phase separates from the aqueous phase. Difficulties in the phase separation occur if any appreciable quantities of interfacial active substances, such as polyglycerines, are formed during the condensation. In this case the phase separation time amounts to a few hours. To enable the phase separation to be carried out more rapidly, therefore, it is recommended that the resin solution be neutralized (U.S. Pat. No. 2.824,855, German Unexamined Specification No. 2,106,788, U.S. Pat. No. 3,309,384, U.S. Pat. No. 2,879,259, U.S. Pat. No. 2,848,435) or that the washing water be given an addition of an inorganic compound by which the phase separation is accelerated (German Examined Specification No. 1,116,398). To enable the inorganic compounds to be washed out in their entirety, the washing process must be carried out 4–5 times, about 500 ml of water being required for each liter of resin solution. Owing to the long settling times involved the volumetric yields per unit of time are very limited.

It is also known that the washing operation can be performed continuously in cascade-type stirring units with separating containers.

The known processes suffer from the following drawbacks:
- As in the case of filtering or centrifuging, the resin still retains glycerine and polyglycerine.
- As when the resin is washed in the stirring unit, the washing operation is non-continuous, involving considerable expenditure of time and large quantities of washing water.
- As the case of the washing operation in the cascade-type agitating apparatus, a large amount of apparatus is required and a great deal of space occupied.
- The waste water containing the resin residues has to be discarded, thus causing environmental pollution.

SUMMARY OF THE INVENTION

The purpose of the invention is to produce epoxide resins of low, medium and high molecular weight in an economical manner and of good quality and to purify the resins as well as the waste water without excessive input of apparatus and with the smallest possible quantities of auxiliary materials.

The aim on which the invention is based is to develop a continuous process for the production and purification of epoxide resins and also of their waste water, enabling ample volumetric yields per unit of time to be obtained and requiring no further starting materials apart from epichlorohydrin, 2,2-bis-(4-hydroxyphenyl)-propane, alkali hydroxide and water.

According to this invention there is provided a process for the production and purification of epoxide resins of low, medium or high molecular weight, by reaction of 2,2-bis-(4-hydroxyphenyl)-propane, epichlorohydrin, alkali hydroxide and water, in which process the reagents are mixed continuously and intensively at a shear rate of $7.5-50 \times 10^4$ $sec^{-1}$ effected by a rotor at a peripheral speed of 15–50 m/sec and the distance of the rotor elements from the stator elements being 0.01 to 0.02 cm, in a reactor having a very limited volume, where they are caused to react at temperatures between 60° and 180° C. within 5 seconds, the reaction product is being dissolved in an organic solvent, the inorganic parts being extracted under counterflow with water in a continuous pulsation unit of the screened floor type using a pulsation amplitude of up to 250 mm and a pulsation frequency of up to 25 Hz, the resulting waste water being extracted with an organic solvent and at atmospheric pressure and at a temperature of between 10° and 85° C.

The reactor may be a multi-stage pumping mixer having a high energy input, a high peripheral speed and a high shearing rate with the concentration of high kinetic energy in a very limited space, this small space rendering it possible to achieve a high velocity of the reaction medium.

It is possible to also cause some of the reagents to react in the reactor and then to be conveyed to a further reactor, where reaction is effected with more reaction components.

Owing to the concentration of considerable kinetic energy in a very narrow space the interfaces of the phases of the heterogeneous reaction mixture are increased considerably. The reaction takes place in an even manner in the reactor, with a high volumetric yield per unit of time, and as a result of the conversion of kinetic energy into thermal energy and the chemical reaction heat produced, the necessary reaction temperature is maintained for the reaction system within the reactor.

The reactor can be fed continuously both with a solution of 2,2-bis-(4-hydroxphenyl)-propane in aqueous alkali hydroxide solution and epichlorohydrine and with a solution of 2,2-bis-(4-hydroxyphenyl)-propane in epichlorohydrine, as well as aqueous alkali hydroxide solution with the resin syntheses taking place in the reactor. This process may be carried out as follows:

(A) The initial substances, 2,2-bis-(4-hydroxyphenyl)-propane, epichlorohydrin and sodium hydroxide solution are continuously mixed in the reactor, at a flow velocity of 15–20 m $sec^{-1}$, and at a shearing rate of $7.5-50 \times 10^4$ $sec^{-1}$, preferably 20–25 m $sec^{-1}$, and at a shearing rate of 2000–2500 m per sec and per cm, and caused to react. The product may then flow continuously into a second reactor, in which the reaction is completed. The reaction product is then further processed in a known manner.

(B) Some of the initial materials, epichlorohydrine, 2,2-bis-(4-hydroxyphenyl)-propane and aqueous sodium hydroxide pass continuously into a first reactor in which they are caused to react and then into a second reactor. This latter is fed continuously with a small proportion of the initial substances which are caused to react therein. The completed reaction product is further processed in a known manner.

The reaction can be continued in a second reactor which may be heated as only small quantity of heat is released in the subsequent reaction.

As the reaction mixture rapidly reaches a relatively high viscosity during the continuous reaction a diluent is preferred to maintain an adequate flow of material. The diluent used primarily is water or of aqueous alkali hydroxide solution.

The process of the invention has advantages as compared with known intermittent and continuous processes. It has the advantages offered by known continuous methods and apart from the initial materials, 2,2-bis-(4-hydroxyphenyl)-propane, epichlorohydrine and aqueous alkali hydroxide solution, it requires neither additional catalysts nor dissolving intermediaries in the form of organic solvents. The reaction speed is far higher than with known processes.

A favorable energy balance is achieved by the using of the reaction heat and the frictional heat.

For the extraction is used a continuous screened floor pulsation unit with between one and eight, preferably four pulsation columns having a pulsation amplitude of up to 250 mm, preferably between 6 and 25 mm, and a pulsation frequency of up to 25 Hz, preferably between 2 and 8 Hz is used, with a solution of 10–60% by weight of resin, preferably 25–45% by weight of epoxide resin on an organic solvent such as toluene. The inorganic salt, including the unconsumed sodium hydroxide and any mineral acid added for neutralization is continuously extracted in counterflow, with water or with epoxide resin waste water having less than 10% by weight of the epoxide resin, using an organic solvent. This is effected at normal pressure and at a temperature of between 10° and 85° C., preferably 50° to 80° C., the quantitative ratio of the organic to the aqueous phase amounting to 2:1 to 5:1, preferably 4:1.

The diameter of a pulsation column may be up to 800 mm.

The process may be carried out using a screened floor pulsation unit pulsed with an inert gas.

The apparatus may include a buffer vessel, a settling tank and one to four screened floor pulsation columns. The buffer vessel serves both to feed in the inert gas used for the pulsation and also to select the best resonance conditions for economical operation of the pulsation system. In the settling tank, into which the screened floor pulsation columns extend, a nozzle is used for the purpose of producing the pulsation required for the process taking into account the difference outflow conditions for liquid and gas respectively. In this process the aqueous phase is continuously removed from the settling tank through the nozzle. The insoluble polymer parts reaching the settling tank from the pulsation columns are continuously removed together with the aqueous phase.

The real purification of the resin proceeds in the screened floor pulsation columns by medium of water. The epoxide resin solution to be purified reaches continuously the pulsation columns from below the floors. In counterflow water is fed to the pulsation columns from above the floors. The neutral epoxide resin solution, freed from insoluble polymer parts, is discharged continuously at the head of the pulsation columns.

The widened head of the pulsation columns ensures separation of the two phases above the screened floors.

A particularly advantageous feature of the process is the fact that any formation of emulsion due to the presence of interfacial active substances is forced back by the pulsation, thus rapid phase separation is possible.

A further particularly advantageous feature is that the process can equally well be used for the purification of waste water accompanying the production of epoxide resin.

The water to be purified enters the pulsation unit continuously, above the screened floors. As organic solvent such as toluene is fed in from below the floors using counterflow. The water, freed of residual resin, is continuously delivered into the sump. The solvent being extracted at the head and re-used in the production of epoxide resin. The process of the invention is thus simple, economical insofar as space is concerned and efficient in comparison with know processes.

EXAMPLE 1

A mixture (A) comprising 55% by weight of 2,2-bis-(4-hydroxyphenyl)-propane and 45% by weight of epichlorohydrin, was preheated to 80° C. and continuously fed into a reactor. At the same time the reactor was fed continuously with a mixture (B), comprising 50% by weight sodium hydroxide and 50% by weight water also preheated to 80° C. The mixtures were conveyed to the reactor with a ratio, of A to B of 2.58:1.

The reaction mixture passed through the reactor and was processed at a shearing rate of 2500 m per second per cm, the temperature reaching 95° C. The mixture leaving the reactor was passed to a container and worked up in a usual manner.

The resulting epoxide resin had the following properties:

| | |
|---|---|
| Epoxide equivalent: | 198 |
| Viscosity (20° C.) | 45 200 cP |
| Saponifiable chlorine: | 0.11% |
| Volatile constituents: | 0.23% |

The resin proved especially suitable as a casting resin for electrical engineering and had excellent dielectric properties.

EXAMPLE 2

A mixture of 23.2% by weight of 2,2-bis-(4-hydroxyphenyl)-propane, 5.7% by weight sodium hydroxide and 71.1% by weight water was heated to 98° C. and fed continuously into a reactor. At the same time epichlorohydriene was fed continuously into the reactor in doses, so that a weight ratio of 2,2-bis-(4-hydroxyphenyl)-propane to epichlorohydrin of 1.75:1 was obtained. The reaction temperature amounted to 100° C., and the product was processed in the reactor using a shearing speed of 2000 m per second per cm.

The reaction product leaving the reactor was subsequently processed in a known manner.

The epoxide resin produced was characterized by the following analysis:

| Epoxide equivalent: | 350 |
|---|---|
| Viscosity at 100° C.: | 750 cP |
| Saponifiable chlorine: | 0.21% |
| Volatile constituents: | 0.32% |

EXAMPLE 3

A mixture comprising 20% by weight of 2,2-bis-(4-hydroxyphenyl)-propane, 75.4% by weight of water and 4.6% by weight of sodium hydroxide was continuously fed at 95° C. to the reactor. At the same time epichlorohydrine was continuously fed into the reactor, so that a weight ratio of 2,2-bis-(4-hydrophenyl)-propane to epichlorohydrin of 1.88:1 was maintained. In the reactor the mixture was processed at a shearing speed of 2000 m per sec and per cm. The reaction took place in the reactor at 95° C. The reaction product then entered a second reactor in which the product was heated to 100° C., in order to complete the reaction. After passing through the second reactor the product was processed in a known manner.

The reaction product has the following properties:

| Epoxide equivalent: | 495 |
|---|---|
| Viscosity at 100° C.: | 2 1 00 cP |
| Saponifiable chlorine: | 0.15% |
| Volatile constituents: | 0.23% |

EXAMPLE 4

A solution of 51% by weight water, 12.7% by weight sodium hydroxide and 36.3% by weight 2,2-bis-(4-hydroxyphenyl)-propane was introduced into a reactor. At the same time epichlorohydrin was fed continuously to the reactor, a weight ratio of 2,2-bis-(4-hydroxyphenyl)-propane to epichlorohydrine of 2.48:1 being maintained. The reaction temperature was 97° C. The product was processed at a shearing speed of 2000 m per sec and per cm. The reaction mixture leaving the reactor was processed in a known manner.

The epoxide resin was characterized by the following analysis:

| Epoxide equivalent: | 1042 |
|---|---|
| Saponifiable chlorine: | Under 0.1% |
| Volatile constituents: | 0.21% |

The resin was especially suitable for use in the production of ricinoleic acid esters.

EXAMPLE 5

A mixture (A), consisting of 55% by weight of 2,2-bis-(4-hydroxyphenyl)-propane and 45% by weight of epichlorohydrine was preheated to 80° C. and conveyed continuously into a reactor. At the same time the reactor was fed continuously with a mixture (B), comprising 50% by weight sodium hydroxide and 50% by weight water also heated to 80° C. The weight ratio (A) to (B) was set at 2.58:1, although the first reactor was only supplied with 60% of the necessary quantity of (B). The product, after passing through the first reactor, entered a second reactor, where the remaining 40% of the necessary quantity of (B) was introduced. In both reactors a reaction temperature of 95° C. was maintained. The shear speed in each case was $7.5-50 \times 10^4$ sec$^{-1}$.

The properties of the epoxide resin are:

| Epoxide equivalent: | 189 |
|---|---|
| Viscosity at 20° C.: | 36 400 cP |
| Saponifiable chlorine: | 0.12% |
| Volatile constituents: | 0.16% |

EXAMPLE 6

A mixture (A) preheated to 80° C. and comprising 38% by weight 2,2-bis-(4-hydroxyphenyl)-propane and 62% by weight epichlorohydrin was fed continuously into the first reactor. At the same time the reactor was fed with a mixture (B), comprising 48% by weight sodium hydroxide and 52% by weight water in doses. The weight ratio of (A) and (B) was 6:1.6. After passing through the first reactor the product was mixed in the second reactor with a mixture comprising 12.4% by weight of 2,2-bis-(4-hydroxyphenyl)-propane, 43.8% by weight of sodium hydroxide and 43.8% by weight of water, and caused to react. The shear speed in both reactors was $7.5-50 \times 10^4$ sec$^{-1}$ and the reaction temperature was 120° C.

After processing the product had the following properties:

| Epoxide equivalent: | 187 |
|---|---|
| Viscosity at 20° C.: | 31 400 cP |
| Saponifiable chlorine: | 0.21% |
| Volatile constituents: | 0.25% |

EXAMPLE 7

100 parts of an organic phase having a density of less than 1 g/ml and a pH value of 9.0, comprising 26.8 parts of an epoxide resin of medium molecular weight, 73.0 parts of toluene and 0.2 parts of an inorganic salt, were fed continuously to a pulsation unit of the screened floor type, from below the floors and with a volumetric rate of 10 parts per hour. The counterflow phase consisted of industrially pure water and was fed continuously to an extraction apparatus from above the floors and at a volumetric rate of 2.5 parts per hour. The resin washing operation was carried out at ambient pressure with a working temperature of 50° to 80° C., and a pulse frequency of 2 Hz and a pulsation amplitude of 8 mm. A weak alkaline and clear salt solution was continuously removed from the lower part of the column. The purified neutral resin solution was removed continuously from the head of the column. The purified epoxide resin had the following characteristic:

Hydrolsable chlorine: 0.1%

EXAMPLE 8

100 parts of an organic phase having a density above 1 g/ml and a pH of 8.5%, comprising 31.0 parts of an epoxide resin of low molecular weight, 65.0 parts of tetrachloroethane and 4 parts of polymer products of unknown constitution, and inorganic salts, were continuously fed to a screened floor pulsation unit from above the floors and with a volumetric speed of 12.5 parts per hour. The counterflow phase comprising industrially pure water was continuously fed to the extraction apparatus, at a volumetric speed of 4.5 parts per hour, from underneath the floors. The resin washing operation was performed at ambient pressure, at a working temperature of 55° to 80° C., using a pulsation frequency of 6 Hz and a pulsation amplitude of 25 mm. The clear neutral resin solution was withdrawn from the head of the column continuously. The weakly alkaline aqueous phase, containing inorganic salt and the undissolved polymer products of unknown constitution, was removed continuously from the head of the column. The purified epoxide resin had the following characteristic:

Hydrolysable chlorine: 0.3%

EXAMPLE 9

100 parts of waste water containing epoxide resin and having a density of above 1 g/ml and a pH of 9.0, and consisting of 0.5 parts of an epoxide resin of medium molecular weight, 13.1 parts of inorganic solid substance and 86.4 parts of weight, were fed continuously to a screened floor pulsation unit from above the screened floors and at a volumetric speed of 10 parts per hour.

The counterflow phase, consisting of industrially pure toluene, was continuously fed to the extraction apparatus, from underneath the floors and at a volumetric speed of 2 parts per hour. The resin washing operation was carried out at 70° C. using a pulsation frequency of 5 Hz and a pulsation amplitude of 20 mm. From the upper pulsation unit a neutral toluene containing epoxide resin was drawn off continuously. The efficiency of the operation of removing the epoxide resin from the waste water was 94%.

What is claimed is:

1. A continuous process for preparing epoxide resins in the presence of water and purifying both the waste water and the epoxide resins, which comprises reacting 2,2-bis-(4-hydroxyphenyl)-propane, epichlorohydrin and alkali metal hydroxide in the presence of water by means of continuously mixing said reactants in the presence of water at a shearing rate of $7.5-50 \times 10^4$ sec$^{-1}$ and per cm and at a temperature of 60°–180° C. in a reaction zone, continuously withdrawing the reaction product, purifying said resin reaction product by dissolving said reaction product in an organic solvent and continuously extracting the inorganic salts formed during the reaction by means of aqueous counterflow to the organic solvent flow in a continuous pulsation amplitude of up to 250 mm, and a pulsation frequency of up to 25 Hz and at atmospheric pressure and at a temperature of 10° to 85° C., and continuously recovering pure neutral epoxide resin solution; and purifying said waste water by counterflow extraction with an organic solvent.

2. A process in accordance with claim 1, wherein a solution of 2,2-bis-(4-hydroxyphenyl)-propane in an aqueous alkali metal hydroxide solution is mixed with epichlorohydrin and reacted.

3. A process in accordance with claim 1, wherein a solution of 2,2-bis-(4-hydroxyphenyl)-propane in epichlorohydrin is mixed with aqueous alkali metal hydroxide solution and reacted.

4. A process in accordance with claim 1, wherein the pulsation unit consists of one to eight pulsation columns.

5. A process in accordance with claim 4, where the pulsation is effected by an inert gas.

6. A process in accordance with claim 5, wherein the inert gas is nitrogen.

7. A process in accordance with claim 4, wherein the pulsation amplitude is 6 to 25 mm and the pulsation frequency is 2 to 8 Hz.

8. A process in accordance with claim 4, wherein the pulsation unit consists of four pulsation columns.

9. A process in accordance with claim 1, wherein the resin solution contains between 10 and 60% by weight of epoxide resin.

10. A process in accordance with claim 9, wherein the percentage is between 25 and 45.

11. A process in accordance with claim 1, wherein the resin is in solution with toluene.

12. A process in accordance with claim 1, wherein the waste water of the epoxide resin contains less than 10% by weight of epoxide resin.

13. A process in accordance with claim 1, wherein the quantitative ratios of organic phase to aqueous phase are between 2:1 and 5:1.

14. A process in accordance with claim 1, wherein the reaction is completed in a further reactor within 5 seconds.

15. A process in accordance with claim 14, wherein a part of the reagents are reacted and conveyed to the further reactor wherein a further part of the reagents are reacted.

* * * * *